Oct. 30, 1934.  R. P. BREESE  1,978,667
BRAKE
Filed Oct. 13, 1932  4 Sheets-Sheet 3

INVENTOR.
Robert P. Breese
BY Jerome R. Cox
ATTORNEY.

Oct. 30, 1934.  R. P. BREESE  1,978,667
BRAKE
Filed Oct. 13, 1932  4 Sheets-Sheet 4

INVENTOR.
Robert P. Breese
BY Jerome R. Cox
ATTORNEY

Patented Oct. 30, 1934

1,978,667

UNITED STATES PATENT OFFICE 1,978,667

BRAKE

Robert P. Breese, South Bend, Ind., assignor to Bendix Aviation Corporation, South Bend, Ind., a corporation of Delaware Application October 13, 1932, Serial No. 637,666

7 Claims. (Cl. 60—54.6)

This invention relates to brakes and more particularly to brake operating structure in which a vacuum motor is utilized for exerting pressure upon liquid in a hydraulic cylinder and in which the pressure thus exerted is transferred through the liquid to points adjacent to the brakes where it is converted into brake applying force.

It has been proposed heretofore to utilize vacuum motors for the application of pressure to liquid in a hydraulic brake system. Where the vacuum motor is associated closely with the hydraulic master cylinder and especially where the two parts are made substantially integral or unitary, it will be found that the operation of the vacuum motor will tend to withdraw liquid from the hydraulic master cylinder and that this liquid will thus be drawn into the intake manifold of the engine.

This process will cause several very disadvantageous results. The drawing of liquid from the master cylinder will cause a lowering of pressure therein and a tendency toward the sucking of air into the hydraulic system. When the air is drawn in the system will become resilient (springy) and will be much less effective than such a system should be.

The continued withdrawal of liquid from the system will deplete the reservoir and the cylinder and the automobile may suddenly become without brakes. The liquid withdrawn through the suction or vacuum motor will pass into the intake manifold of the engine and will injure the functioning of the engine through dilution of the explosive mixture and through the deposit of foreign matter. Even without the withdrawal of an appreciable amount of liquid from the hydraulic brake system the suction will so lower the pressure in the chamber back of the hydraulic brake master cylinder piston, that efficient compensation of the cylinder will be interfered with.

One of the objects of this invention is the provision of a seal for preventing the withdrawal of liquid by suction from a hydraulic brake system when the system is operated by a vacuum motor.
A further object of the invention is the prevention of the lowering of pressure in a hydraulic brake system by reason of its association with a vacuum motor.

A feature of the invention is the provision of an air chamber intermediate the vacuum cylinder and the liquid cylinder and the provision of a vent opening connecting this chamber with the atmosphere.

A further feature of the invention is the provision of a flexible hose which passes through one of the vacuum chambers for forming the connection with the atmosphere.

Further features and objects of the invention will be apparent after a reading of the subjoined specification and claims and after a consideration of the accompanying drawings in which:

Figure 5 is a fragmentary view in vertical section on a larger scale than Figure 2 showing the grooved packings and spring associated therewith.

Figure 1:
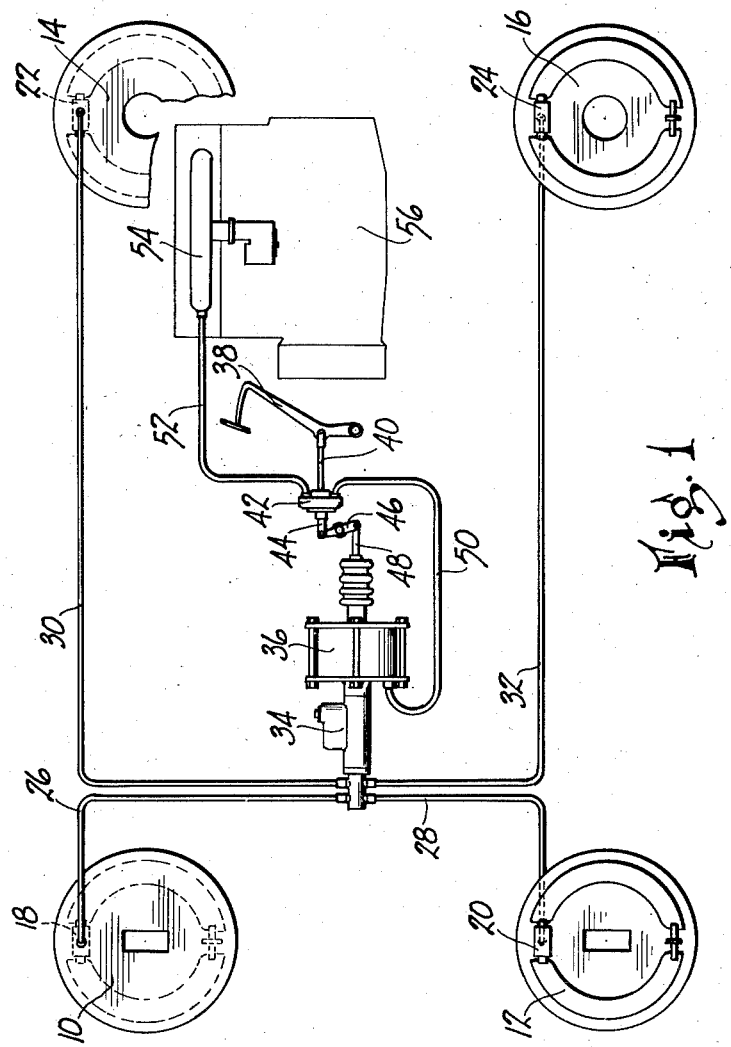
Figure 1 is a diagrammatic view showing the essential parts of a hydraulic brake system operated through a vacuum motor.

Referring particularly to Figure 1 of the drawings, it may be seen that there are provided brakes 10, 12, 14, and 16 equipped with wheel cylinders 18, 20, 22, and 24 respectively. When it is desired to operate the brakes, pressure is transmitted through liquid conduits 26, 28, 30, and 32 respectively, the pressure being produced for all of these conduits by means of a master cylinder 34. The master cylinder is adapted to be operated either by a vacuum motor 36 or a foot pedal 38, the connection from the foot pedal 38 including a tension rod 40, a vacuum control valve 42, another rod 44, a pivoted lever 46 and a rod 48. Operation of the pedal 38 exerts a tension upon the rod 40 and thus actuates the valve 42. Actuation of the valve 42 causes air to be drawn from the vacuum motor 36 through tubes 50 and 52 into the intake manifold 54 of the engine 56.

Figure 2:
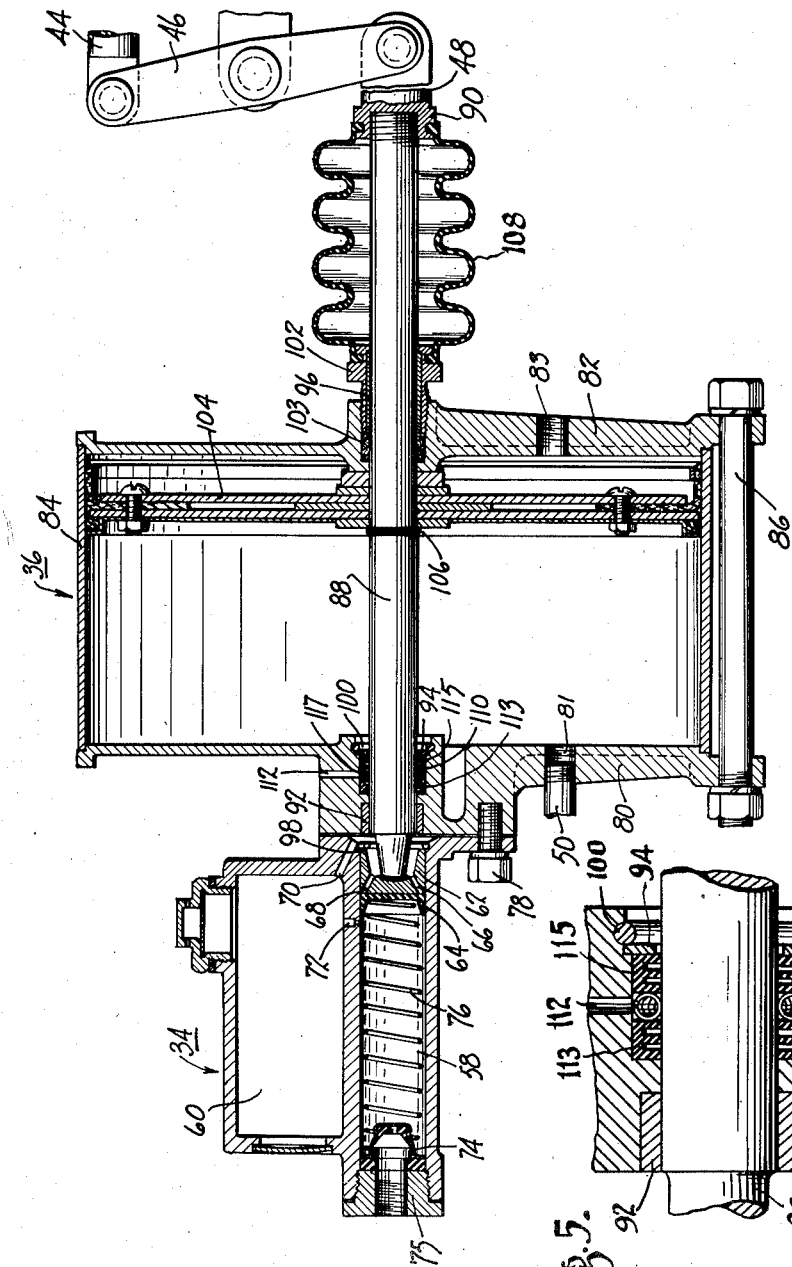
Figure 2 is an enlarged view in vertical section of the vacuum motor and hydraulic master cylinder shown diagrammatically in Figure 1.

The structure of the vacuum motor and master cylinder is shown more clearly in Figure 2. Therein it may be seen that the master cylinder 34 includes a cylinder proper 58 and a reservoir 60 formed integrally therewith. The cylinder 58 is provided with a piston 62 having a cup 64 secured to the forward face thereof and having ports 66 and 68 leading from a chamber rearward of the piston to the cup 64. The chamber rearward of the piston is connected with the reservoir 60 by means of a port 70 and the portion of the cylinder ahead of the piston 62 is connected normally to the reservoir by means of a port 72. However, when the piston advances on its brake applying stroke, the port 72 is covered so that no liquid may flow back from the portion of the system ahead of the piston to the reservoir. Locking ring 98 forms a stop for the rearward stroke of piston 62, toward which it is urged by spring 76 upon withdrawal of piston rod 88.

The front end of the cylinder 58 is provided with a spring loaded check valve 74 mounted on a cylinder head 75. The valve allows substantially free movement of fluid forward but limits the return of liquid so that a predetermined pressure of liquid is normally maintained in the hydraulic system ahead of the check valve. The valve 74 is loaded by the spring 76 and as the piston 62 advances, the pressure upon the valve 74 is correspondingly increased.

Secured to the master cylinder 34 by bolts such as 78 is the vacuum motor 36. This motor comprises a head 80 formed with a port 81 and a head 82 formed with a port 83. These heads are spaced from each other by an open ended cylinder 84 and maintained in assembled relationship by means of bolts such as 86. Extending through the motor 36 and into the cylinder 34 is a piston rod 88. The piston rod 88 bears upon the piston 62 and has its rear end secured to a fitting 90, the latter being connected through a clevis to the end of the compression rod 48. The piston rod 88 passes through bearing 92 at the forward end of the motor 36 and bearing 96 at the rearward end thereof. Bearing 96 is secured in packing gland nut or plug 102 which also functions to keep packing 103 tight. Positioned in the motor 36 is a piston 104 which is operatively connected to the piston rod 88 by means of a spring ring 106 so that movement of the piston 104 forward requires a similar forward movement of the piston rod 88. Nevertheless, the rod 88 may be moved independently of movement of the piston should the vacuum suction from the motor fail for any reason. A dust bellows 108 is connected to the fitting 90 and the plug 102.

In the forward head of the motor 36 there is provided an air chamber 110 connected through a port 112 with the atmosphere. This chamber insures that the suction created in the motor 36 shall not withdraw liquid from the chamber of the master cylinder rearward of the piston 62. It also insures that the suction in the motor shall not decrease the pressure in the hydraulic brake system. Positioned in the chamber 110 are a pair of annular grooved packings 113 and 115 which are resiliently held in spaced relationship by a circular coil spring 117. Packing rings 113 and 115 and spring 117 are retained in position in chamber 110 by washer 94 and locking ring 100.

In the operation of the above described form of my invention, the application of manual force to the pedal 38 opens the valve 42 and (provided the motor is exerting suction) withdraws air from the portion of the cylinder 36 ahead of the piston 104 through the exhaust opening 81. Air entering the portion of the motor rearward of the piston 104 through the opening 83 forces the piston 104 forward. Inasmuch as the piston in forward movement is keyed to the piston rod 88 by means of the stop 106, this forces the piston 62 forward covering the port 72 and applying pressure to the liquid in the conduits 26, 28, 30, and 32 and at the brakes 10, 12, 14, and 16, thus applying the brakes. If the suction of the motor should for any reason fail, continued pressure upon the pedal 38 after the valve 42 is opened, operates through a lost motion connection in the valve to exert tension upon the rod 44 and through the lever 46 to exert pressure upon the rod 48. Inasmuch as the fitting 90 is secured to the piston rod 88, the physical effort is thus transmitted to the piston rod 88 and thus to the hydraulic piston 62 to apply pressure to the hydraulic fluid. When the pressure on the pedal is withdrawn, the valve 42 is shifted to allow air to enter through the port 81, and the spring 76, together with the brake release springs at the wheels, moves the parts to the position shown.

Figure 3:
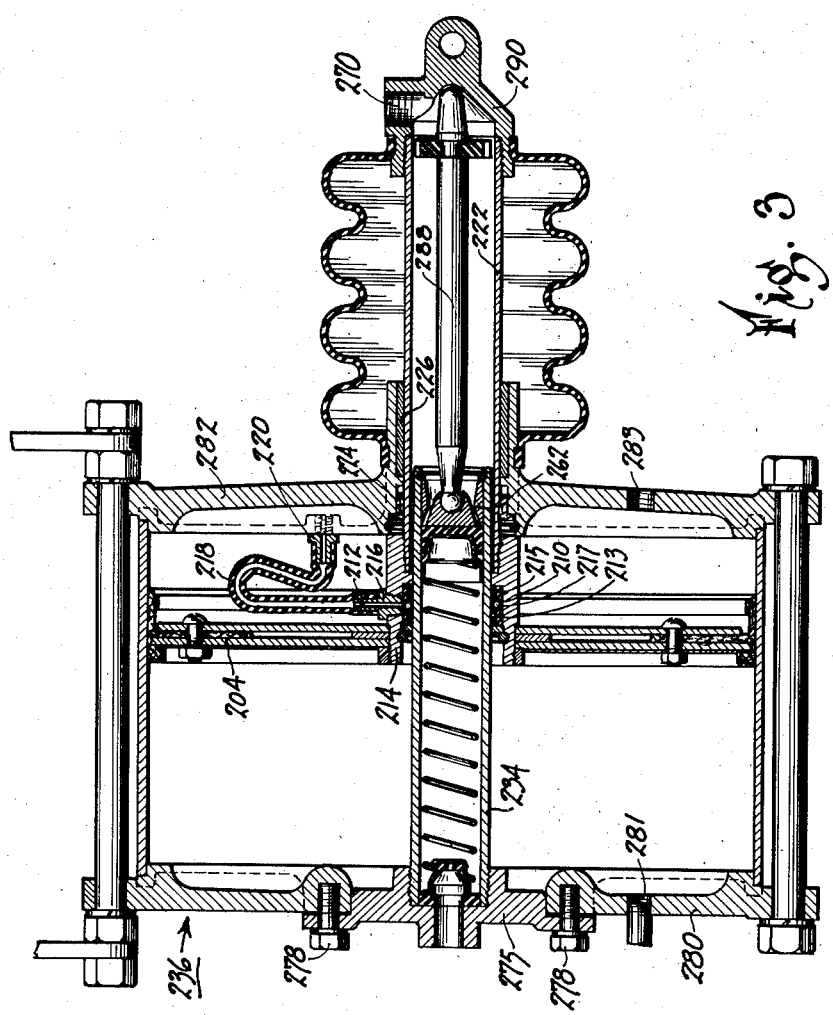
Figure 3 is a view similar to Figure 2 showing a different arrangement of the vacuum cylinder and the master cylinder so designed that the master cylinder is concentric within the vacuum cylinder and so that space is thus economized.

In Figure 3 there is shown a slightly different arrangement. The motor 236 comprises a forward head 280 having a central opening in which there is secured by means of bolts such as 278 a smaller concentric plate 275 which forms a forward head for the hydraulic cylinder 234. The motor 236 is provided with a piston 204 to the central portion of which there is secured a bushing 214 formed with an air chamber 210. The chamber has its opposite sides sealed by packings 213 and 215, between which there is positioned the spring 217. A plug 216 has a bore 212 which connects the air chamber 210 with a flexible hose 218 connected at its opposite end to a plug 220 extending through the rear head 282 to the atmosphere. Screwed into the bushing 214 is a rearwardly extending cylinder 222 having a slightly larger internal diameter than the external diameter of the cylinder 234 and having its rear end screwed into a fitting 290 which is connected through suitable linkage with the pedal. The fitting 290 is formed with a bore 270 which is connected with a detached liquid reservoir. Packing 224 and bearing 226 are provided in the head 282 for the cylinder 222.

The operation of this form of my invention is similar to that described above in connection with the forms shown in Figures 1 and 2. However, the vacuum motor herein is of the vacuum suspended type, the ports 281 and 283 normally connected to the intake manifold. When the pedal is depressed, the valve corresponding to the valve 42 is shifted so that the opening 283 is then connected to the atmosphere. This causes the piston 204 to be moved forward and through the bushing 214, cylinder 222, and fitting 290 causes the piston rod 288 also to be moved forward. In a manner similar to that previously described, this movement of the piston rod also moves the hydraulic piston 262 forward and thus applies pressure to the liquid to apply the brakes. The chamber 210 moves with the bushing 214 and insures that the suction in the motor 236 is sealed at all times from the liquid in the cylinders 234 and 222. The flexible hose 218 maintains atmospheric pressure in the chamber 210 regardless of the position of the bushing.

Figure 4:
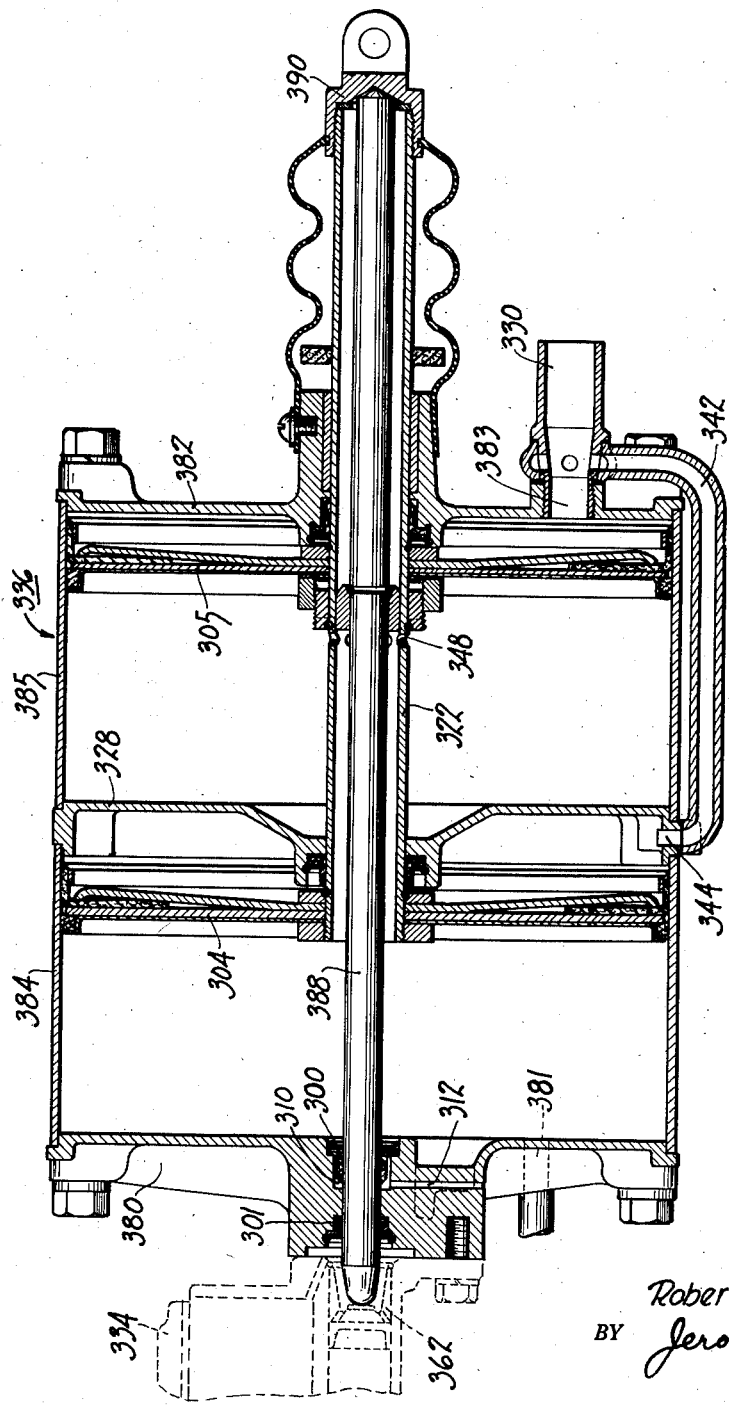
Figure 4 is a view in section similar to Figures 2 and 3 and showing another modified form of vacuum cylinder in which two vacuum cylinders are arranged in tandem whereby lateral space is economized.

In Figure 4 there is shown a vacuum motor 336 formed by a forward head 380 having an exhaust port 381; a rearward head 382 having a combined inlet and exhaust port 383; an intermediate head 328; and a pair of cylinders 384 and 385. The motor is provided with pistons 304 and 305 which are secured to a sleeve 322 in turn secured through the fitting 390 with the piston rod 388. The piston rod bears upon a piston 362 arranged in the master cylinder 334, a packing 300 associated with the head 380 is positioned rearward of a recess 310 and another packing 301 positioned forwardly thereof seal the recess from the vacuum cylinder and the hydraulic cylinder. The recess is vented to the atmosphere by a port 312, and thus serves as an air seal.

Connected to the port 383 is a threaded tube 330 through which the air is normally drawn by the suction of the motor. Connected to the tube 330 is a tube 342 which leads to a port 344 formed in the head 328 in advance of the partition formed thereby but rearwardly of the piston 304. Associated with the tube 330 is a valve member (not shown) which may be turned to cause air to be withdrawn through the ports 344 and 383 or to cause air to enter said ports from the atmosphere. The port 381 is always connected with the suction of the manifold. The cylinder 322 is provided with a plurality of ports such as 348 so that there is constant communication between the portion of the cylinder ahead of the piston 304 and the portion rearward of the head 328 but ahead of the piston 305.

It is thought that the operation of this form of my invention will be clear from the above description when taken in connection with the description of the operation of the forms previously described. Normally, vacuum is maintained in all four sections of the power cylinder 336. However, when the valve member is turned to permit air under atmospheric pressure to enter through ports 344 and 383, the pressure of the air forces the pistons 304 and 305 forward and with them moves the piston rod 388 and the hydraulic piston 362 to apply pressure to the liquid to actuate the brakes. Upon reversal of the valve air is withdrawn from the power cylinder through the ports 344 and 383 and the spring in the master cylinder corresponding to the spring 76 forces the piston rod 388 together with the pistons 304 and 305 rearwardly to the position shown in Figure 4.

It is to be understood that the above described embodiments of my invention are for the purpose of illustration only and various changes may be made therein without departing from the spirit and scope of the invention.

I claim:

1. In a hydraulic brake system, hydraulic brake operating means including a liquid container, vacuum means including a fluid container having a portion thereof surrounding a portion of said liquid container for operating said hydraulic means, and means for sealing said fluid container from said liquid container, said sealing means comprising an air chamber connected by a hose with the atmosphere interposed between said liquid container and said fluid container.

2. In a hydraulic brake system, hydraulic brake operating means including a liquid container, vacuum means including a fluid container having a portion thereof surrounding a portion of said liquid container for operating said hydraulic means, and means for sealing said fluid container from said liquid container, said sealing means comprising an air chamber connected by a flexible hose with the atmosphere, interposed between said liquid container and said fluid container.

3. In a hydraulic brake system, hydraulic brake operating means including a liquid container, vacuum means including a fluid container aligned with and having a portion thereof surrounding a portion of said liquid container for operating said hydraulic means, and means for sealing said fluid container from said liquid container, said sealing means comprising a movable air chamber connected with the atmosphere by a flexible hose which passes through the fluid container interposed between said liquid container and said fluid container.

4. In a hydraulic brake system, vacuum means including a fluid container and including means for withdrawing air from and for producing subatmospheric pressure in said container, hydraulic brake operating means including a liquid container positioned within said fluid container and operated by said vacuum means, and means for sealing said fluid container from said liquid container, said sealing means comprising an air chamber interposed between said liquid container and said fluid container and a flexible hose connecting said air chamber with the atmosphere and extending through said fluid container.

5. In a hydraulic brake system, hydraulic brake operating means including a liquid cylinder, vacuum means including a fluid cylinder associated with said liquid cylinder for operating said hydraulic means, and means for sealing said fluid cylinder from said liquid cylinder, said sealing means comprising an air chamber interposed between said liquid cylinder and said fluid cylinder, one of said cylinders being positioned within the other.

6. In a hydraulic brake system, hydraulic brake operating means including a liquid cylinder, vacuum means including a fluid cylinder associated with said liquid cylinder for operating said hydraulic means, and means for sealing said fluid cylinder from said liquid cylinder, said sealing means comprising an air chamber interposed between said liquid cylinder and said fluid cylinder, one of said cylinders being positioned concentrically within the other.

7. In a hydraulic brake system, vacuum means including a fluid cylinder, hydraulic brake operating means including a liquid cylinder positioned concentrically within said fluid cylinder and operated by said vacuum means, and means for sealing said fluid container from said liquid container, said sealing means comprising an air chamber interposed between said liquid container and said fluid container.

ROBERT P. BREESE.